United States Patent
Chang

(10) Patent No.: US 10,191,450 B2
(45) Date of Patent: Jan. 29, 2019

(54) METHOD AND APPARATUS FOR GENERATING BINARY HOLOGRAM

(71) Applicant: ELECTRONICS AND TELECOMMUNICATIONS RESEARCH INSTITUTE, Daejeon (KR)

(72) Inventor: Eun Young Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 24 days.

(21) Appl. No.: 15/381,520

(22) Filed: Dec. 16, 2016

(65) Prior Publication Data

US 2017/0176930 A1    Jun. 22, 2017

(30) Foreign Application Priority Data

Dec. 18, 2015  (KR) .................. 10-2015-0182054
Aug. 5, 2016  (KR) .................. 10-2016-0100322

(51) Int. Cl.
*G03H 1/22* (2006.01)
*G03H 1/08* (2006.01)

(52) U.S. Cl.
CPC ......... *G03H 1/0808* (2013.01); *G03H 1/0841* (2013.01); *G03H 2210/30* (2013.01); *G03H 2210/441* (2013.01); *G03H 2210/45* (2013.01); *G03H 2240/41* (2013.01)

(58) Field of Classification Search
CPC .......... G03H 1/08; G03H 1/08; G03H 1/2249; G06K 9/48388

USPC ....................................... 359/9, 11; 382/199
See application file for complete search history.

(56) References Cited

U.S. PATENT DOCUMENTS

| | | | | |
|---|---|---|---|---|
| 5,119,439 | A * | 6/1992 | Osawa ................. | G06K 9/4638 382/199 |
| 8,384,769 | B1 * | 2/2013 | Hong .................... | H04N 13/004 345/6 |
| 8,620,099 | B2 | 12/2013 | Sim | |
| 8,873,120 | B2 * | 10/2014 | Tsang ...................... | G03H 1/08 359/11 |
| 9,086,681 | B2 | 7/2015 | Schwerdtner | |
| 2009/0153569 | A1 | 6/2009 | Park et al. | |
| 2012/0007946 | A1 * | 1/2012 | Baba ..................... | G03H 1/2249 348/40 |
| 2015/0323900 | A1 | 11/2015 | Oh et al. | |

FOREIGN PATENT DOCUMENTS

| JP | 5516957 B2 | 6/2014 |
|---|---|---|
| KR | 1998-044999 A | 9/1998 |
| KR | 10-2014-0111782 A | 9/2014 |

OTHER PUBLICATIONS

"IDW '15 The 22nd International Display Workshops", Dec. 9-11, 2015, pp. 1-223, ITE, Society for Information Display.

* cited by examiner

*Primary Examiner* — Audrey Y Chang

(57) ABSTRACT

Provided is a method and apparatus for generating a binary hologram. More particularly, provided is a method and apparatus that may decrease or, alternatively, minimize quality degradation of a binary hologram by employing a silhouette mask of a target object to reduce or, alternatively, minimize background noise occurring around the target object to be reproduced when generating the binary hologram.

14 Claims, 7 Drawing Sheets

COLOR INFORMATION    DEPTH INFORMATION

SECOND QUANTIZATION

FIRST QUANTIZATION

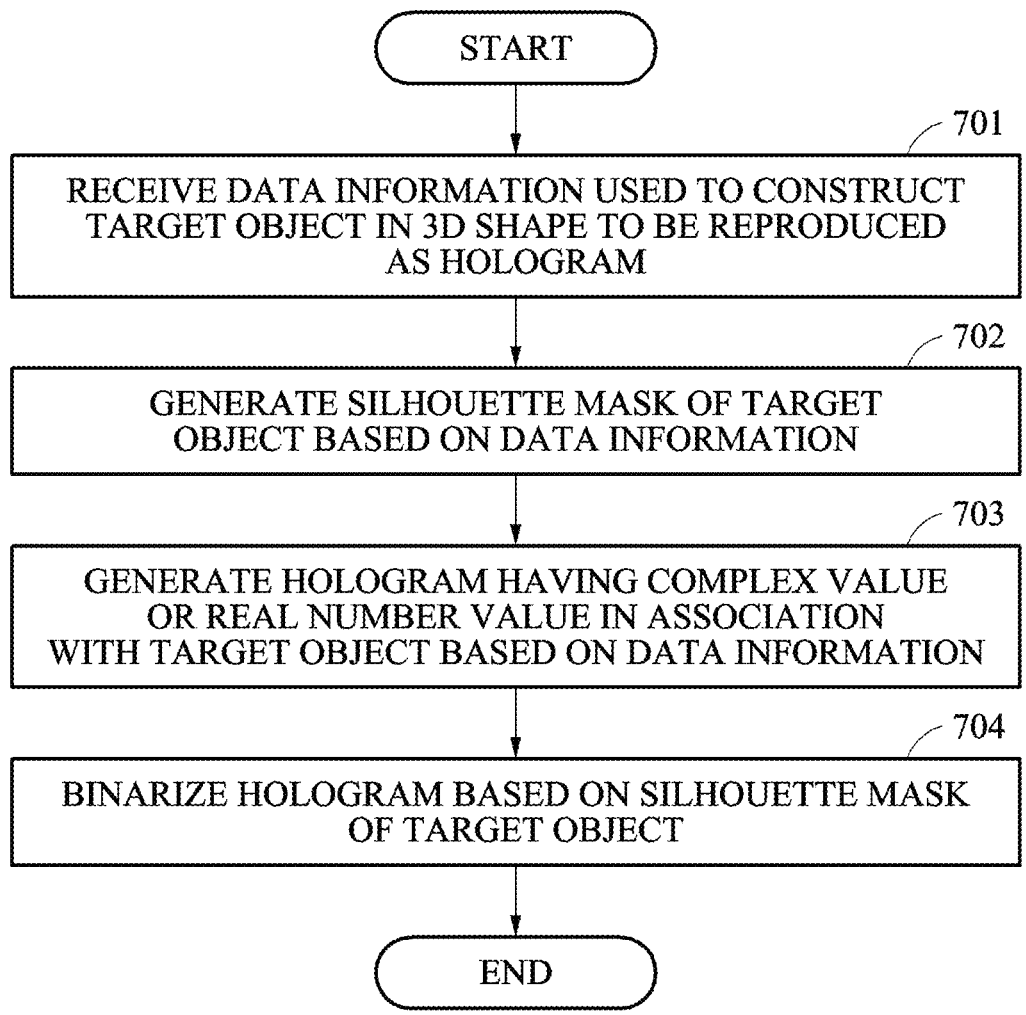

METHOD AND APPARATUS FOR GENERATING BINARY HOLOGRAM

CROSS-REFERENCE TO RELATED APPLICATION(S)

This application claims the priority benefit of Korean Patent Application No. 10-2015-0182054 filed on Dec. 18, 2015, and Korean Patent Application No. 10-2016-0100322 filed on Aug. 5, 2016, in the Korean Intellectual Property Office, the disclosures of which are incorporated herein by reference for all purposes.

BACKGROUND

1. Field

One or more example embodiments relate to a method of generating a binary hologram and a binary hologram generation apparatus for performing the method, and more particularly, to a method and apparatus that may decrease or, alternatively, minimize background noise occurring after a binary hologram generation process.

2. Description of Related Art

Recently, with the boost of three-dimensional (3D) imaging industry and 3D display industry, research on holography technology, known as a 3D imaging scheme, has been actively conducted. Here, the holography technology may record phase information of an object by the interference between two light waves, "reference wave" and "object wave". Such holography technology may have the most excellent characteristics in a depth effect, etc., compared to other 3D imaging methods, and enables a user to observe a 3D image without having a visual fatigue.

Also, thanks to the dramatically developed digital technology and computing technology, the holography technology may produce a hologram through computer-generated hologram (CGH) technology that generates an interference pattern between an object wave and a reference wave through a computer simulation, instead of using an optical method.

Accordingly, a hologram generated through a computer may reproduce a holographic 3D image through optical reconstruction using a spatial light modulator (SLM). Here, in the case of the holographic 3D image, a type of a hologram to be used may vary based on a type of the SLM. In particular, a digital micro-mirror display (DMD) uses a hologram having a binary value (0, 1) based on whether a micro mirror operates or not. However, when the DMD needs to use a 1-bit hologram, a binary hologram having a 1-bit value is to be generated from a calculated complex value or real number value. Accordingly, due to constraints that a binary hologram also has to use a binary value, a quality degradation may occur similar to as in a binary image.

Accordingly, there is a need for a method that may decrease or, alternatively, minimize a quality degradation after generating a binary hologram.

SUMMARY

At least one example embodiment provides a binary hologram generation method and apparatus that may employ a silhouette mask of a target object during a binarization process to decrease or, alternatively, minimize a quality degradation occurring around the target object when generating a binary hologram of the target object to be reproduced.

According to an aspect of at least one example embodiment, there is provided a method of generating a binary hologram, the method including receiving data information used to construct a target object in a three-dimensional (3D) shape to be reproduced as a hologram; generating a silhouette mask of the target object based on the data information; generating a hologram having a complex value or a real number value in association with the target object based on the data information; and binarizing the hologram having the complex value or the real number value based on the silhouette mask of the target object.

The data information may include depth information and color information of the target object between which a one-to-one correspondence mapping is established, and the depth information may be quantized to 256 levels (8 bits).

The hologram may be visualized as an image having a resolution of M×N that satisfies a spatial resolution of a spatial light modulator (SLM) and represented based on 256 levels (8 bits).

The binarizing may include performing a first quantization process of allocating 0 or 1 to each of pixels that constitute a plane of the hologram; applying the silhouette mask to the hologram quantized to 0 or 1; and performing a second quantization process based on a distance between the silhouette mask applied to the quantized hologram and each pixel of the plane.

The performing of the first quantization process may include allocating 0 or 1 to each pixel of the plane based on a threshold thereof.

The threshold may include one of a mean value, a median value, and a mid-point value using an absolute value of the complex value or the real number value.

The performing of the first quantization process may include allocating 0 to a pixel if a value of the corresponding pixel is less than the threshold; and allocating '1' to a pixel if a value of the corresponding pixel is greater than or equal to the threshold.

The performing of the second quantization process may include determining an inverse number value of the distance between the silhouette mask and each pixel of the plane; and performing the second quantization process based on the determined inverse number value of the distance.

The distance between the silhouette mask and each pixel of the plane may be based on at least one of a horizontal distance and a vertical distance between the silhouette mask and each pixel of the plane.

According to another aspect of at least one example embodiment, there is provided a method of generating a binary hologram, the method including receiving data information used to construct a target object in a 3D shape to be reproduced as a hologram; generating a silhouette mask of the target object based on the data information; generating a hologram having a complex value or a real number value in association with the target object based on the data information; applying the silhouette mask of the target object to the hologram having the complex value or the real number value; determining a distance between the silhouette mask applied to the hologram and each of pixels that constitute a plane of the hologram; and setting a different threshold to each pixel of the plane by applying the determined distance to a threshold set to the hologram.

The binarizing may include allocating 0 or 1 to each pixel value based on the different threshold set to each pixel of the plane.

According to another aspect of at least one example embodiment, there is provided an apparatus for generating a binary hologram, the apparatus including an information receiver configured to receive data information used to construct a target object in a 3D shape to be reproduced as a hologram; a silhouette mask generator configured to generate a silhouette mask of the target object based on the data information; a hologram generator configured to generate a hologram having a complex value or a real number value in association with the target object based on the data information; and a binarizer configured to binarize the hologram having the complex value or the real number value based on the silhouette mask of the target object.

The binarizer may include a first quantizer configured to perform a first quantization process of allocating 0 or 1 to each of pixels that constitute a plane of the hologram; a silhouette mask applier configured to apply the silhouette mask to the hologram quantized to 0 or 1; and a second quantizer configured to perform a second quantization process based on a distance between the silhouette mask applied to the quantized hologram and each pixel of the plane.

The first quantizer may be further configured to allocate 0 or 1 to each pixel of the plane based on a threshold thereof.

The first quantizer may be further configured to allocate 0 to a pixel if a value of the corresponding pixel is less than the threshold, and to allocate '1' to a pixel if a value of the corresponding pixel is greater than or equal to the threshold.

The second quantizer may be further configured to perform a second quantization process based on an inverse number value of a distance between the silhouette mask and each pixel of the plane.

According to example embodiments, there may be provided a binary hologram generation method and apparatus that may generate a binary hologram by employing a silhouette mask of a target object to decrease, or alternatively, minimize a quality degradation occurring around the target object through a binarization when generating the binary hologram, and may decrease or, alternatively, minimize the quality degradation occurring due to background noise around the target object at optical reconstruction.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 is a flowchart illustrating a method of generating a binary hologram according to an example embodiment.

DETAILED DESCRIPTION

Figure 1:
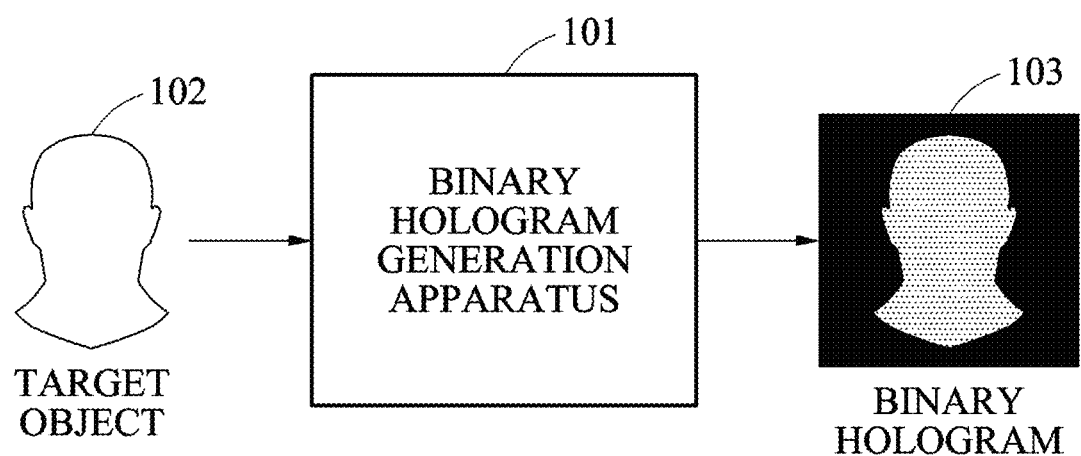
FIG. 1 is a diagram illustrating a configuration of a binary hologram generation apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments will be described with reference to the accompanying drawings.

FIG. 1 is a diagram illustrating a configuration of a binary hologram generation apparatus according to an example embodiment.

Referring to FIG. 1, a binary hologram generation apparatus 101 may generate a binary hologram 103 of a target object 102 to be reproduced. Here, the binary hologram generation apparatus 101 may generate the binary hologram 103 by applying a silhouette mask of the target object 102 to remove background noise occurring around the target object 102 after a process of generating the binary hologram 103. The binary hologram generation apparatus 101 may decrease or, alternatively, minimize a quality degradation by background noise occurring around the target object 102 by generating the binary hologram 103 using the silhouette mask of the target object 102.

To this end, the binary hologram generation apparatus 101 may receive data information of the target object 102 to be reproduced as a binarized hologram. The data information of the target object 102 may include color information and depth information of the target object 102, which will be further described with reference to FIG. 3. The target object 102 refers to a target to be reproduced as a three-dimensional (3D) image, and may be a model in a 3D shape. For example, the target object 102 may include a 3D model that is represented in a head shape of a human being, and may include a scene to be reproduced.

The binary hologram generation apparatus 101 may generate the silhouette mask of the target object 102 based on the received data information of the target object 102. That is, the binary hologram generation apparatus 101 may generate the silhouette mask corresponding to an external appearance of the target object 102 based on color information and depth information that are included in the data information of the target object 102.

The binary hologram generation apparatus 101 may generate a hologram having a complex value or a real number value in association with the target object 102, based on the data information. Here, a hologram may be generated by the interference between an object wave reflected from an object, for example, a target to be reproduced and a reference wave incident in a predetermined direction, and may be generated according to computer-generated hologram (CGH) technology for generating the interference pattern between an object wave and a reference wave through a computer simulation. Also, when generating a hologram, a virtual 3D object may be regarded as an aggregation of self-emitting point light sources having the same angular intensity distribution characteristic, which may become an object wave. Accordingly, a digital hologram generation method may representatively employ Rayleigh-Sommerfeld (R-S) integral, and may include a Fresnel hologram, Fourier hologram, etc., based on an approximation method thereof. Here, a method of generating a hologram based on 3D data information may generate a hologram through a variety of methods in addition to the aforementioned methods.

The binary hologram generation apparatus 101 may binarize the hologram using the silhouette mask of the target object 102. The binary hologram generation apparatus 101 may binarize the hologram by performing a first quantization process and a second quantization process.

In detail, the binary hologram generation apparatus 101 may perform a first quantization process of allocating 0 or 1 to each of pixels (also, referred to as each pixel of a plane) that constitute a plane of the hologram. The binary hologram generation apparatus 101 may perform the first quantization process by changing a value set to each pixel of the plane to 0 or 1. Here, the binary hologram generation apparatus 101 may allocate 0 or 1 to each pixel of the plane based on a threshold thereof.

The binary hologram generation apparatus 101 may apply the silhouette mask to the hologram quantized to 0 or 1. That is, the binary hologram generation apparatus 101 may overlap the silhouette mask generated based on the external appearance of the target object 102 over the hologram quantized to 0 or 1. That is, the binary hologram generation apparatus 101 may apply the silhouette mask of the target object 102 over the quantized hologram so that a shape of the target object 102 to be reproduced may appear in the hologram quantized to 0 or 1. Accordingly, whether each of the pixels that constitute the plane of the hologram is present within or outside the silhouette mask may be verified.

The binary hologram generation apparatus 101 may perform the second quantization process based on a distance between the silhouette mask applied to the quantized hologram and each of the pixels that constitute the plane of the quantized hologram present outside the silhouette mask, that is, a mask-to-pixel distance. Through the process, the binary hologram generation apparatus 101 may generate the binary hologram 103 of the target object 102 by binarizing the hologram having the complex value or the real number value.

The binary hologram generation apparatus 101 may use the silhouette mask of the target object 102 to reduce or, alternatively, minimize background noise of the target object 102 occurring after a hologram binarization process. The binary hologram generation apparatus 101 may generate the binary hologram 103 of which quality degradation occurring after the hologram binarization process is minimized by binarizing the hologram having the complex value or the real number value using the silhouette mask of the target object 102.

Figure 2:
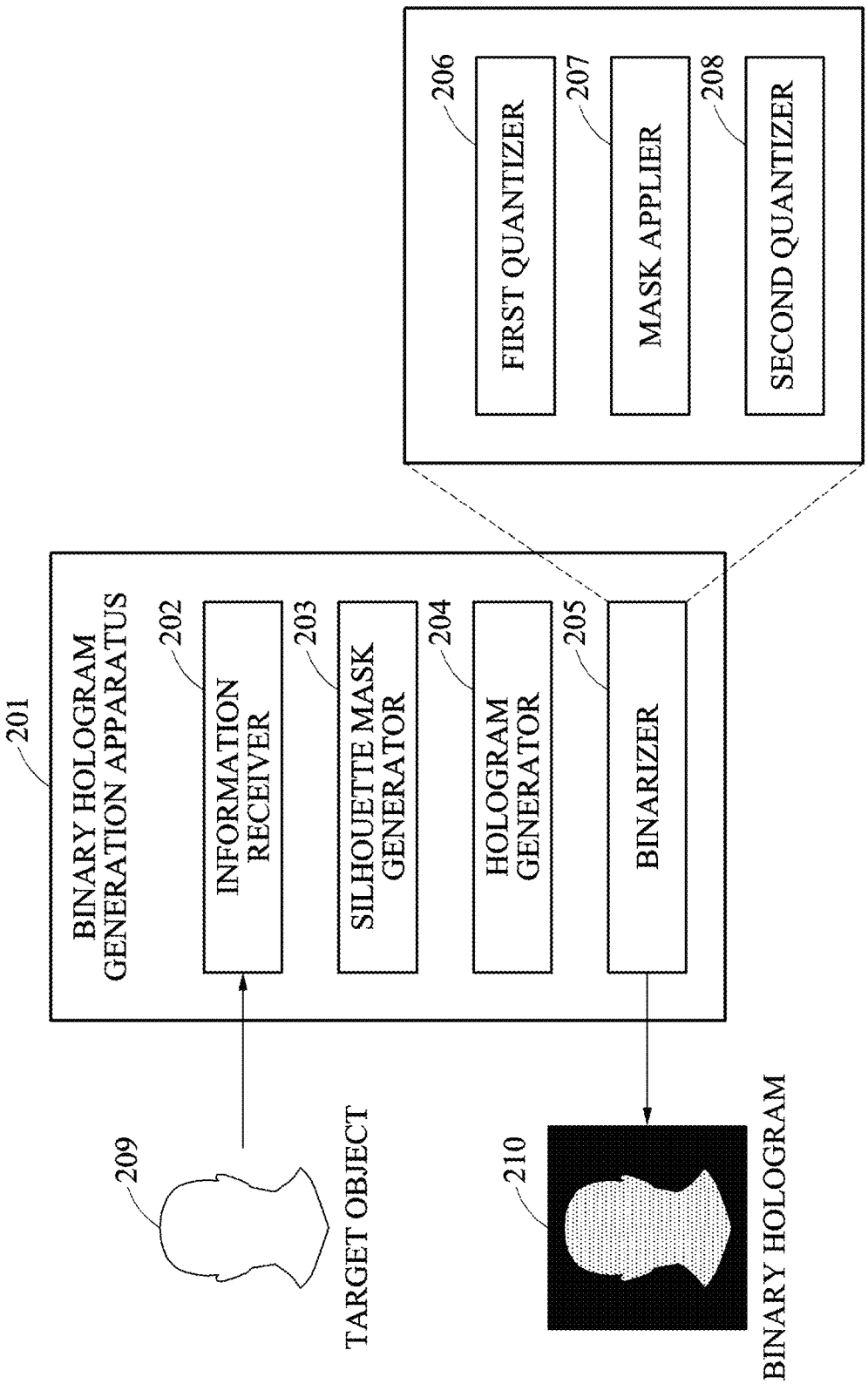
FIG. 2 is a diagram illustrating a configuration of a binary hologram generation apparatus according to an example embodiment.

FIG. 2 is a diagram illustrating a configuration of a binary hologram generation apparatus according to an example embodiment.

Referring to FIG. 2, a binary hologram generation apparatus 201 may generate a binary hologram 210 of a target object 209 by binarizing a hologram having a complex value or a real number value in association with the target object 209 to be reproduced. To this end, the binary hologram generation apparatus 201 may include an information receiver 202, a silhouette mask generator 203, a hologram generator 204, and a binarizer 205.

The information receiver 202 may receive data information used to construct the target object 209 in a 3D shape to be reproduced as a hologram. In detail, the information receiver 202 may receive data information that includes color information and depth information of the target object 209. Here, the color information and the depth information of the target object 209 may have a one-to-one correspondence mapping.

The silhouette mask generator 203 may generate the silhouette mask of the target object 209 based on the data information. That is, the silhouette mask generator 203 may generate the silhouette mask that represents an external appearance of the target object 209 to be reproduced.

For example, the silhouette mask generator 203 may generate the silhouette mask that represents the external appearance of the object target 209 based on the data information. Here, the silhouette mask generator 203 may set a region of interest (ROI) associated with the external appearance of the target object 209, and may generate the silhouette mask of the target object 209 by separating an area corresponding to the external appearance of the target object 209 and a background area from the ROI.

As another example, the silhouette mask generator 203 may generate the silhouette mask of the target object 209 based on feature points of the target object 209. That is, the silhouette mask generator 203 may extract feature points associated with the external appearance of the target object 209 based on color information and depth information of the target object 209 that are included in the data information. In detail, the silhouette mask generator 209 may extract outline feature points corresponding to a facial area of the target object 209. The silhouette mask generator 203 may generate the silhouette mask from the facial area of the target object 209 based on the extracted feature points. In addition, the silhouette mask generator 203 may generate the silhouette mask of the target object 209 through various algorithms besides the aforementioned methods.

The hologram generator 204 may generate the hologram having the complex value or the real number value in association with the target object 209 based on data information. Here, the hologram having the complex value or the real number value may be visualized as an image having a resolution of M×N that satisfies a spatial resolution of a spatial light modulator (SLM) and represented based on 256 levels (8 bits).

The binarizer 205 may binarize the hologram having the complex value or the real number value using the silhouette mask of the target object 209. To this end, the binarizer 205 may include a first quantizer 206, a mask applier 207, and a second quantizer 208.

The first quantizer 206 may perform a first quantization process of allocating 0 or 1 to each of pixels that constitute a plane of the hologram. That is, the first quantizer 206 may perform the first quantization process by changing a value set to each pixel of the plane to 0 or 1.

Here, the first quantizer 206 may calculate a global threshold for each pixel of the plane in order to perform the first quantization process. Here, the global threshold may be i) one of a mean value, a median value, and a mid-point value using an absolute value of the complex value or ii) one of a mean value, a median value, and a mid-point value using the real number value. Also, the global threshold may include at least one value corresponding to each pixel value.

The first quantizer 206 may allocate 0 or 1 to each pixel based on a threshold thereof. In detail, if a value of a pixel is less than the threshold, the first quantizer 206 may allocate 0 to the corresponding pixel. Also, if a value of a pixel is greater than or equal to the threshold, the first quantizer 206 may allocate 1 to the corresponding pixel.

As described above, the first quantizer 206 may perform the first quantization process on the hologram having the complex value or the real number value by changing, to 0 or 1 based on the threshold, a value set to each of the pixels that constitute the plane of the hologram having the complex value or the real number value.

Although it is described that the first quantization process is performed using the global threshold, it is provided as an example only. The first quantization process may be performed using an iterative calculation method and the like, instead of using the global threshold.

The mask applier 207 may apply the silhouette mask to the hologram quantized to 0 or 1. The mask applier 207 may apply the silhouette mask of the target object 102 to the quantized hologram so that a shape of the target object 102 to be reproduced may appear in the hologram quantized to 0 or 1. Accordingly, whether each of the pixels that constitute the plane of the hologram is present within or outside the silhouette mask may be verified.

The second quantizer 208 may perform a second quantization process based on a distance between the silhouette mask applied to the quantized hologram and each of the pixels that constitute the plane of the quantized hologram present outside the silhouette mask, that is, a mask-to-pixel distance. Here, the distance between the silhouette mask and each pixel of the plane may be determined based on at least one of a horizontal distance and a vertical distance from the silhouette mask.

In detail, the second quantizer 208 may calculate a horizontal/vertical distance between each pixel of the plane and a most proximate pixel present in the silhouette mask, for example, a facial area of the target object 209. The second quantizer 208 may acquire an inverse number value of the calculated distance (or apply a weight to the calculated distance) and may multiply the inverse number value (or the distance to which the weight is applied) by a first quantization value. Accordingly, a pixel to which 0 is allocated may be maintained to have 0 as is, and a value having a decimal point may be allocated to a pixel to which 1 is allocated. The second quantizer 208 may calculate a final result that a pixel has a value of 0 or 1 by rounding off the value having the decimal point or by applying thresholding based on a specific value, for example, 0.2.

According to example embodiments, the second quantization process may be performed by applying thresholding based on a specific value, for example, 4, using a weight or a distance between pixels, as well as an inverse number value.

The second quantizer 208 may calculate the distance using a variety of methods, such as Euclidean distance, Hausdorff distance, a square distance of Euclidean distance, etc.

The second quantizer 208 may determine an inverse number value of the distance between the silhouette mask and each pixel of the plane. The second quantizer 208 may perform the second quantization process on the hologram to which the first quantization process is performed based on the determined inverse number value of the distance.

That is, if a distance from the silhouette mask to a pixel that constitutes a plane of the quantized hologram is relatively far, it may indicate that the corresponding pixel is highly likely to act as background noise rather than acting as significant data associated with the target object 209. The silhouette mask refers to information indicating the external appearance of the target object 209. If a distance from the silhouette mask to a pixel is relatively proximate, it may indicate that the corresponding pixel is highly likely to be significant data.

Accordingly, the second quantizer 208 may filter out data associated with background noise occurring after the hologram binarization process by performing the second quantization process based on the distance between the silhouette mask and each pixel.

The binarizer 205 may generate the binary hologram 210 of the target object 209 by performing the aforementioned process.

Although not illustrated in FIG. 2, the binary hologram generation apparatus 201 may binarize the hologram having the complex value or the real number value through the following process, instead of performing the first quantization process and the second quantization process.

In detail, the binary hologram generation apparatus 201 may receive data information used to configure the target object 209 in the 3D shape to be reproduced as a hologram and may generate the silhouette mask of the target object 209 based on the data information.

The binary hologram generation apparatus 201 may generate the hologram having the complex value or the real number value in association with the target object 209 based on the data information. The binary hologram generation apparatus 201 may apply the silhouette mask of the target object 209 to the hologram having the complex value or the real number value.

The binary hologram generation apparatus 201 may determine a distance between the silhouette mask applied to the hologram and each of the pixels that constitute the hologram. The binary hologram generation apparatus 201 may set a different threshold to each pixel of the plane by applying the determined distance to a threshold set to the hologram. That is, a pixel relatively far from the silhouette mask may be set to have a relatively high threshold. The binary hologram generation apparatus 201 may binarize the hologram in which different thresholds are set to pixels.

Figure 3:
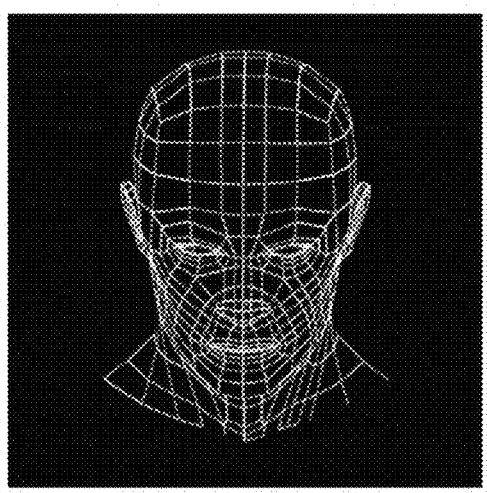
FIG. 3 illustrates examples of data information of a target object according to an example embodiment.
Figure 3:
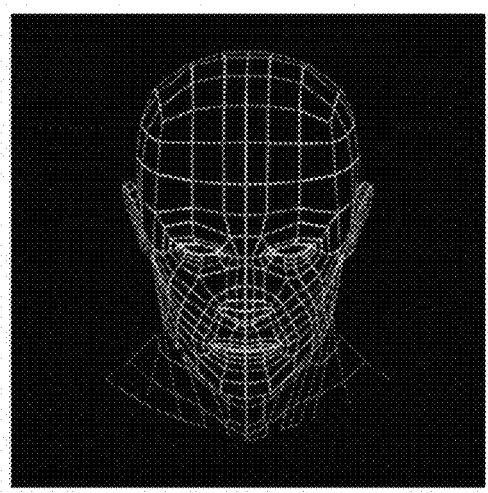

FIG. 3 illustrates examples of data information of a target object according to an example embodiment.

Referring to FIG. 3, a binary hologram generation apparatus may receive data information used to construct the target object in a 3D shape. Here, the data information used to construct the target object in the 3D shape may include color information and depth or displacement information associated with the target object and a scene. That is, CGH technology generally used to generate a hologram may use color information, for example, red, green, blue (RGB), and 3D spatial information, for example, X, Y, and Z, associated with the target object or the scene to be reproduced, in order to generate the hologram through a computer simulation. Accordingly, the binary hologram generation apparatus may receive color information and depth information of the target object as data information used to construct the target object in the 3D shape.

Also, the data information may be a model having a surface and may be a wireframe model as shown in FIG. 3 and may include color information and depth information thereof. Without being limited thereto, the example embodiments may be configured in various shapes. Color information and depth information have a one-to-one correspondence mapping, and the depth information is quantized to 256 levels (8 bits).

Figure 4:
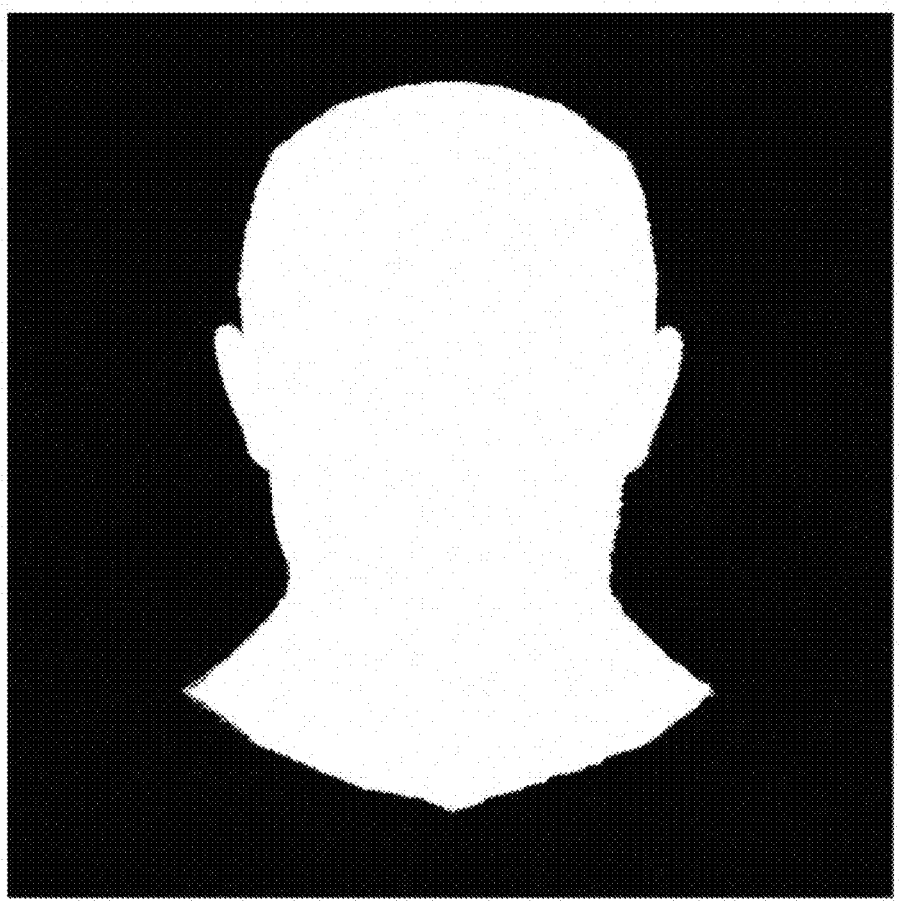
FIG. 4 illustrates an example of a silhouette mask of a target object according to an example embodiment.

FIG. 4 illustrates an example of a silhouette mask of a target object according to an example embodiment.

Referring to FIG. 4, a binary hologram generation apparatus may generate the silhouette mask of the target object based on data information. That is, the binary hologram generation apparatus may generate the silhouette mask corresponding to the external appearance of the target object based on color information and depth information that are included in data information of the target object.

Figure 5:
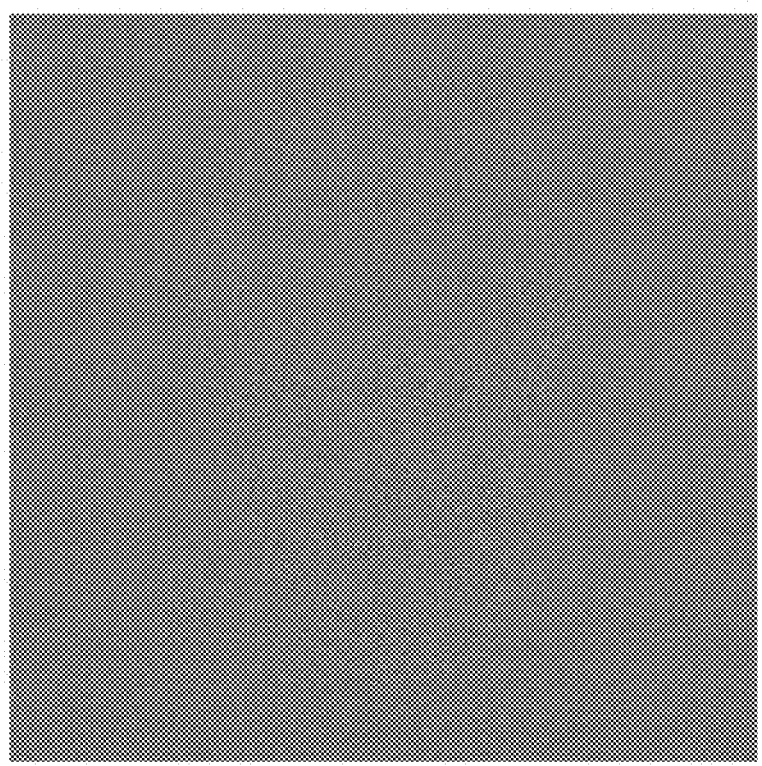
FIG. 5 illustrates an example of a hologram having a complex value or a real number value in association with a target object according to an example embodiment.

FIG. 5 illustrates an example of a hologram having a complex value or a real number value in association with a target object according to an example embodiment.

Referring to FIG. 5, a binary hologram generation apparatus may generate the hologram having the complex value or the real number value in association with the target object 102 of FIG. 2 based on data information. Here, the hologram of FIG. 5 is represented as an 8-bit (256 levels) image based on an absolute value of the complex value for visualization. The hologram may be represented as an image having a resolution of M×N that satisfies a spatial resolution of an SLM and may be represented as data having a complex value or a real number value in a form of M×N.

Figure 6C:
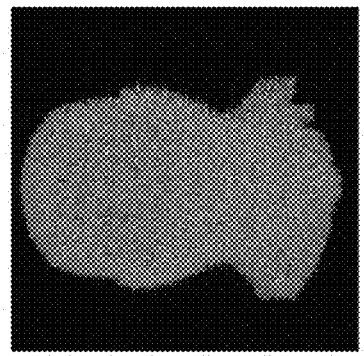
FIGS. 6A-6C illustrate an operation of binarizing a hologram according to an example embodiment.
Figure 6B:
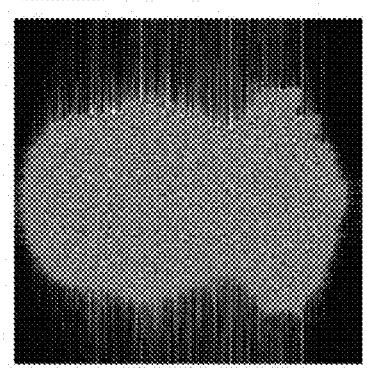
Figure 6A:
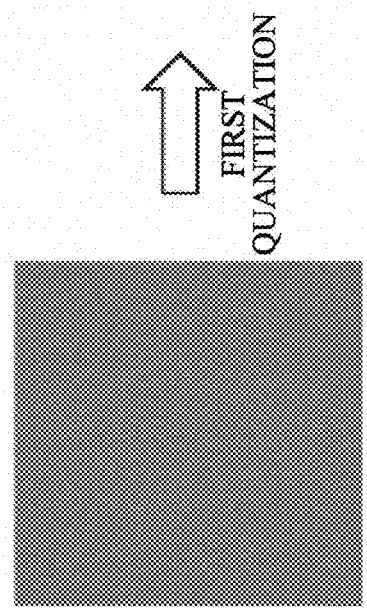

FIG. 6 illustrates an operation of binarizing a hologram according to an example embodiment.

Referring to (a) of FIG. 6, a binary hologram generation apparatus may generate a hologram capable of representing a hologram having an absolute value of a complex value as an 8-bit (256-level) image. That is, the binary hologram generation apparatus may generate a hologram having a complex value or a real number value from data information. Here, the hologram may actually have an absolute value of the complex value rather than 8-bit image which is just for the visualization.

The binary hologram generation apparatus may perform a first quantization process of allocating 0 or 1 to each of pixels that constitute a plane of the hologram. In detail, the binary hologram generation apparatus may perform the first quantization process on the hologram represented as the absolute value of the complex value or the real number value, based on a medium value (=(MAX+MIN)/2) with respect to the range of the real number value or the absolute value of the complex value.

(b) of FIG. 6 may show a result of performing the first quantization process. Referring to (b) of FIG. 6, lines connected to the target object may appear around the target object after binarization, which may act as background noise in actual optical reconstruction.

According to example embodiments, it is possible to enhance the quality of a holographic 3D reconstruction image by removing such background noise. To this end, the binary hologram generation apparatus may perform a second quantization process using the silhouette mask of the target object and may filter outportions corresponding to the background noise. Accordingly, it is possible to reduce a quality degradation by the background noise occurring around the target object as shown in (c) of FIG. 6.

FIG. 7 is a flowchart illustrating a method of generating a binary hologram according to an example embodiment.

In operation 701, a binary hologram generation apparatus may receive data information used to construct a target object in a 3D shape to be reproduced as a hologram. Here, the data information may include color information and depth information of the target object between which a one-to-one correspondence mapping is established. The depth information may be quantized to 256 levels (8 bits).

In operation 702, the binary hologram generation apparatus may generate a silhouette mask of the target object based on the data information.

In operation 703, the binary hologram generation apparatus may generate a hologram having a complex value or a real number value in association with the target object based on the data information. Here, the hologram having the complex value or the real number value may be represented as a 256 levels (8 bits) image for the visualization having a resolution of M×N that satisfies a spatial resolution of an SLM.

In operation 704, the binary hologram generation apparatus may binarize the hologram having the complex value or the real number value using the silhouette mask of the target object. In detail, the binary hologram generation apparatus may perform a first quantization process of allocating 0 or 1 to each of pixels that constitute a plane of the hologram. The binary hologram generation apparatus may allocate 0 or 1 to each pixel based on a threshold thereof. Here, the threshold may include at least i) one of a mean value, a median value, and a mid-point value using an absolute value of a complex value or ii) one of a mean value, a median value, and a mid-point value using a real number value.

The binary hologram generation apparatus may allocate 0 to a pixel if a value of the corresponding pixel is less than the threshold, or may allocate 1 to a pixel if a value of the corresponding pixel is greater than or equal to the threshold.

The binary hologram generation apparatus may apply the silhouette mask to the hologram quantized to 0 or 1.

The binary hologram generation apparatus may perform a second quantization process based on a distance between the silhouette mask applied to the quantized hologram and each pixel of the plane. The binary hologram generation apparatus may determine an inverse number value of the distance between the silhouette mask and each pixel of the plane. The binary hologram generation apparatus may perform the second quantization process using the determined inverse number value of the distance.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a binary hologram, the method comprising:
    receiving data information used to construct a target object in a three-dimensional (3D) shape to be reproduced as a hologram;
    generating a silhouette mask of the target object based on the data information;
    generating a hologram having a complex value or a real number value in association with the target object based on the data information; and
    binarizing the hologram by:
        performing a first quantization process of allocating 0 or 1 to each pixel that constitutes a plane of the hologram;
        applying the silhouette mask to the hologram quantized to 0 or 1; and
        performing a second quantization process based on a distance between the silhouette mask applied to the quantized hologram and each pixel of the plane that is outside the silhouette mask, and
        displaying the hologram on a spatial light modulator (SLM).

2. The method of claim 1, wherein the data information includes depth information and color information of the target object between which a one-to-one correspondence mapping is established, and
the depth information is quantized to 256 levels (8 bits).

3. The method of claim 1, wherein the spatial light modulator (SLM) has a resolution of M×N that has 256 levels (8 bits).

4. The method of claim 1, wherein performing the first quantization process comprises allocating 0 or 1 to each pixel of the plane based on a threshold thereof.

5. The method of claim 4, wherein the threshold includes at least one of a mean value, a median value, and a mid-point value using an absolute value of the complex value or one of a mean value, a median value, and a mid-point value using the real number value.

6. The method of claim 4, wherein performing the first quantization process comprises:
    allocating 0 to a pixel if a value of the corresponding pixel is less than the threshold; and
    allocating 1 to a pixel if a value of the corresponding pixel is greater than or equal to the threshold.

7. The method of claim 1, wherein performing the second quantization process comprises:
    determining an inverse number value of the distance between the silhouette mask and each pixel of the plane; and
    performing the second quantization process based on the determined inverse number value of the distance.

8. The method of claim 7, wherein the distance between the silhouette mask and each pixel of the plane is based on at least one of a horizontal distance and a vertical distance between the silhouette mask and each pixel of the plane.

9. A method of generating a binary hologram, the method comprising:
    receiving data information used to construct a target object in a three-dimensional (3D) shape to be reproduced as a hologram;
    generating a silhouette mask of the target object based on the data information;
    generating a hologram having a complex value or a real number value in association with the target object based on the data information;
    applying the silhouette mask of the target object to the hologram having the complex value or the real number value;
    determining a distance between the silhouette mask applied to the hologram and each pixel that constitutes a plane of the hologram;
    setting a different threshold to each pixel of the plane outside of the silhouette mask by applying the determined distance to a threshold set to the hologram;
    binarizing all pixels in the hologram by using the different threshold; and
    displaying the hologram on a spatial light modulator (SLM).

10. The method of claim 9, wherein the binarizing comprises:
    allocating 0 or 1 to each pixel value based on the different threshold set to each pixel of the plane.

11. An apparatus for generating a binary hologram, the apparatus comprising:
    an information receiver configured to receive data information used to construct a target object in a three-dimensional (3D) shape to be reproduced as a hologram;
    a silhouette mask generator configured to generate a silhouette mask of the target object based on the data information;
    a hologram generator configured to generate a hologram having a complex value or a real number value in association with the target object based on the data information; and
    a binarizer configured to binarize the hologram,
    wherein the binarizer comprises:

a first quantizer configured to perform a first quantization process of allocating 0 or 1 to each of pixels that constitute a plane of the hologram;

a silhouette mask applier configured to apply the silhouette mask to the hologram quantized to 0 or 1; and a second quantizer configured to perform a second quantization process based on a distance between the silhouette mask applied to the quantized hologram and each pixel outside the silhouette mask.

12. The apparatus of claim 11, wherein the first quantizer is further configured to allocate 0 or 1 to each pixel of the plane based on a threshold thereof.

13. The apparatus of claim 12, wherein the first quantizer is further configured to allocate 0 to a pixel if a value of the corresponding pixel is less than the threshold, and to allocate '1' to a pixel if a value of the corresponding pixel is greater than or equal to the threshold.

14. The apparatus of claim 11, wherein the second quantization process is based on an inverse number value of a distance between the silhouette mask and each pixel of the plane that is outside the silhouette mask.

* * * * *